United States Patent [19]
Andronica

[11] Patent Number: 6,030,156
[45] Date of Patent: Feb. 29, 2000

[54] DRILL AND SHARPENING FIXTURE

[76] Inventor: Randall Andronica, 1815, Coleman St., Brooklyn, N.Y. 11234

[21] Appl. No.: 09/061,714
[22] Filed: Apr. 17, 1998
[51] Int. Cl.[7] .................................................... B23B 51/02
[52] U.S. Cl. ........................ 408/144; 408/199; 408/211; 408/223; 408/229
[58] Field of Search ..................... 408/199, 211, 408/212, 223, 224, 228, 144, 229; 76/5.1; 407/54

[56] References Cited

U.S. PATENT DOCUMENTS

| | | | |
|---|---|---|---|
| 2,289,065 | 1/1942 | Oliver | 408/199 |
| 2,575,332 | 11/1951 | Cummins | 408/144 |
| 2,977,828 | 4/1961 | Strickland | 408/228 |
| 3,580,269 | 5/1971 | Ehrens | 408/199 |
| 4,212,569 | 7/1980 | Andersson et al. | 408/144 |
| 4,338,050 | 7/1982 | Ozer et al. | 408/211 |
| 4,395,169 | 7/1983 | Kashiwagi et al. | 408/211 |
| 4,449,865 | 5/1984 | Yankovoy et al. | 408/224 |
| 4,605,347 | 8/1986 | Jodock et al. | 408/224 |
| 5,597,273 | 1/1997 | Hirsch | 408/199 |
| 5,665,914 | 9/1997 | Taniguchi | 408/199 |

FOREIGN PATENT DOCUMENTS

| | | | |
|---|---|---|---|
| 81003 | 5/1984 | Japan | 407/54 |

*Primary Examiner*—Daniel W. Howell
*Attorney, Agent, or Firm*—Galagano & Burke

[57] ABSTRACT

A single point drill particularly adapted to producing small diameter deep holes utilizing a peck feed cycle routine. The preferred embodiment features a limited flute length with a depth approximately $\frac{1}{3}$ the drill diameter and a dual point edge consisting of a shallow cutting angle and a steep relief angle. A negative rake angle runs along this edge functioning as a knife edge that will cut on opposite rotation, countering the unbalanced forces inherent in a single point tool. A sharpening fixture consisting of 2 parallel slates secured with a T-headed bolt and an anti-rotation pin. The lower plate features a central groove to locate the drill, the upper plate having a short land that facilitates orienting and clamping the drill flute. The forward end of the fixture mimics the drill point allowing the drill to be sharpened on a grinder table or by hand with a suitable abrasive stone or file.

16 Claims, 7 Drawing Sheets

DRILL AND SHARPENING FIXTURE

BACKGROUND OF INVENTION

The current invention relates to improvements in drills and especially drills for producing small diameter holes, and in particular drills capable of producing deep holes on the order of 50–200× the drill diameter.

Producing holes by drilling in sizes below 1/16 to the depths indicated has been all but unobtainable using conventional drills and equipment. In the case of difficult materials such as 300 series stainless steels, drilling beyond 10× the drill diameter has been unachievable in these small sizes.

In addition, maintaining small size drills in share cutting condition requires very sophisticated and expensive resharpening equipment. Because of the great expense involved in the resharpening of small drills, it is common practice to simply discard dull drill bits.

OBJECTS OF THE INVENTION

It is therefore an object of the current invention to provide a drill that can be produced in sizes at least as small as 0.005" capable of drilling 50× its diameter in readily drillable materials. And it is an object to produce a drill at least as small as 0.015" capable of drilling to depths of 50× the drill diameter in difficult to drill materials such as 316 stainless steel. Still another objective is to provide a drill that will produce accurate holes closely sized to the drill size. Yet still another object is to provide a drill that will drill straight holes. It is still another object to provide a long wearing point. Again yet another object is to provide a drill capable of performing to the aforementioned depths on conventional machine shop equipment without the need of special equipment or attachments.

It is still another object to provide a drill that can be resharpened without the need of specialized resharpening equipment. It is another object to provide a drill that can be economically mass produced.

Another object is to provide a fixture for facilitating resharpening of the drills using common shop grinding equipment. Again, another objective is to provide a fixture that can accomodate a range of drill diameters for resharpening. Futher objects and advantages will he seen from the text and drawings that follow.

SUMMARY OF INVENTION

The current invention consists of a drill constructed from suitable cutting material (H.S.S. or carbide) and consists of a straight diameter throughout its length and terminates in a single point cutting edge. The cutting edge is created by the flute which is approximately 1/3 the drill diameter. This flute is preferably of a uniform dimension but may be tapered. The length of the flute is limited (from 4–20× the drill diameter) depending on the material to be drilled. Additionally the flute ends in a radius or an angle for strength. In one embodiment the point consists of a single compound angle resembling a boring bar. In another embodiment the point consists of a dual compound angle ground to the centerline. The lesser angle being the drilling portion is inclined to create a conical point. The oppossing relief angle has the addition of a negative rake angle creating a "knife-edge" counter cutting surface.

The sharpening fixture consists of two halves of rectangular stock, secured by a T-head central screw in conjunction with an antirotation pin. An axial groove in the rectangular member and a cross hole in the screw facilitates the central positioning of the drill in the fixture. A raised land on the forward portion of the upper member clamps and orients the drill. Set screws or a rear raised land control the attitude of upper clamping member insuring positive clamping. The forward portion of the fixture mimics the drill geometry. A longitudinal bevel facilitates grinding the negative rake angle. The flat base and the horizontal fixturing of the drill enables regrinding to the centerline.

PRIOR ART

Deep holes produced by the drilling process has been accomplished by gun drilling. This is accomplished on specialized machines with special drills that may be single or double pointed and which characteristically have a thru the tool coolant port. Additionally they have a substantial flute length. Gun drills however are not available much below 1/16".

In addition to gun drills, half round drills (FIG. X,Y,Z) bear a strong resemblence to the current invention and they are available in small sizes. These drills differ in that they have a concave flute 99. The flute length is longer 101 and it is ground to the centerline, whereas the flute on the current invention is shorter in length, ground straight across, and ground to about 1/3 the diameter. In addition the point geometry is different, half round drills employ the helical point 100 of a conventional twist drill.

While 1/2 round drills are well known in the art their use is restricted to readily drillable materials such as wood, brass, etc. They are not utilized for drilling difficult materials such as 316 SS.

Much of the prior art regarding the drilling of small holes has not been very forthcoming as to drill geometry, method of drilling, pointing and resharpening of the tool.

In 1887 Sawyer discloses a method for manufacturing drills (U.S. Pat. No. 361,452 using an acid bath to dissolve away a reactive metal from an electrodeposited wire to expose a point. He does not illustrate a geometry of this tool stating only "The tip may be given any special shape by means of filing". This is by no means obvious, and would be considered an incredible feat even today—considering he suggests this be done to a wire possibly less than 0.001" in diameter!

Latour (Pat. No. 2,968,200) and Mieville (Pat. No. 3,029,644) both disclose drills for drilling small size holes. Both being primarily directed towards a synethic body for holding and driving the tool. Neither divulge the geometry of the drill point, flute construction or overall tool extension. In addition Mieville's tool is supposedly capable of drilling extremely hard metal while the tool is purportedly constructed of an elastic steel wire. He does not divulge what extremely hard materials his tool will drill, but it is well known a cutting tool will not cut a material harder than itself. Additionally, producing drills in this fashion has to increase the cost of the tool.

Pat. No. 3,824,026 discloses a point geometry similiar to one of the embodiments of the present invention. This geometry is for a double edged tool with inverted oppositely disposed cutting edges however.

The patent to Kashwagi and Kasutani (Pat. No. 4,395,169) divulges a similiar dual edge single point tool geometry in a V groove fluted gun drill of their design as well as illustrating a similiar prior art geometry.

Saxon et al (Pat. No. 4,536,108) disclose a microdrill with a larger shank diameter somewhat similiar to one of the embodiments disclosed in the current invention.

The teachings of Frank (Pat. No. 3,029,664) while not for a drill divulges a peck feed drill cycle method utilized by the current invention for drilling small holes.

The patent to English (Pat. No. 3,121,983) discloses a fixture very similiar to the current invention except it was designed for twist type drills and has a different clamping arrangement as well as lacking an unrelieved clamping land, which orients the flute and secures the drill.

The patent to Wolf (Pat. No. 4,566,227) also disclose a similiar type of fixture for sharpening drills on a grinder table having a different means of securing the drill.

The current invention overcomes the limitations of the prior art and offers additional advantages as will be seen.

DESCRIPTION OF THE INVENTION

Figure 1:
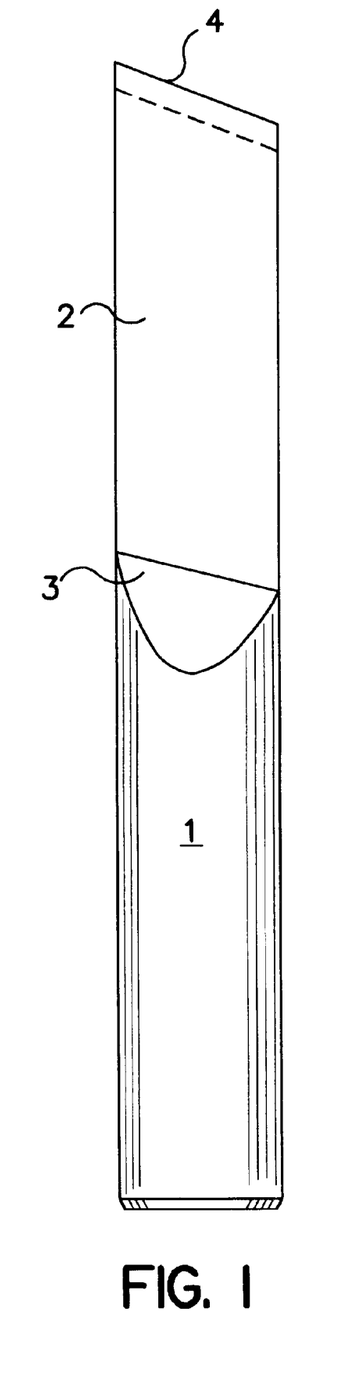
FIG. 1 is a plan elevation view of the simplest embodiment of the drill.

Referring to FIG. 1, in which the simplest embodiment of this invention is shown, the drill consists of a solid cylindrical length of suitable cutting material (high speed steel or carbide) generally indicated at 1.

Figure 2:
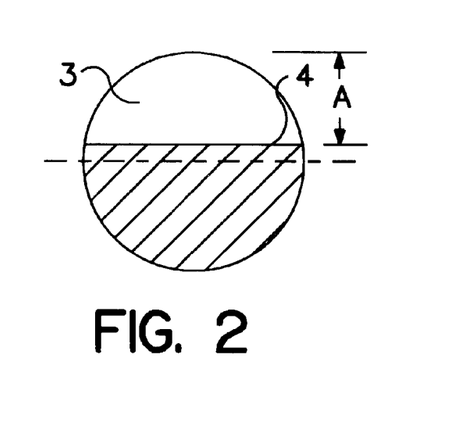
FIG. 2 is a head on view of the embodiment in FIG. 1.
Figure 3:
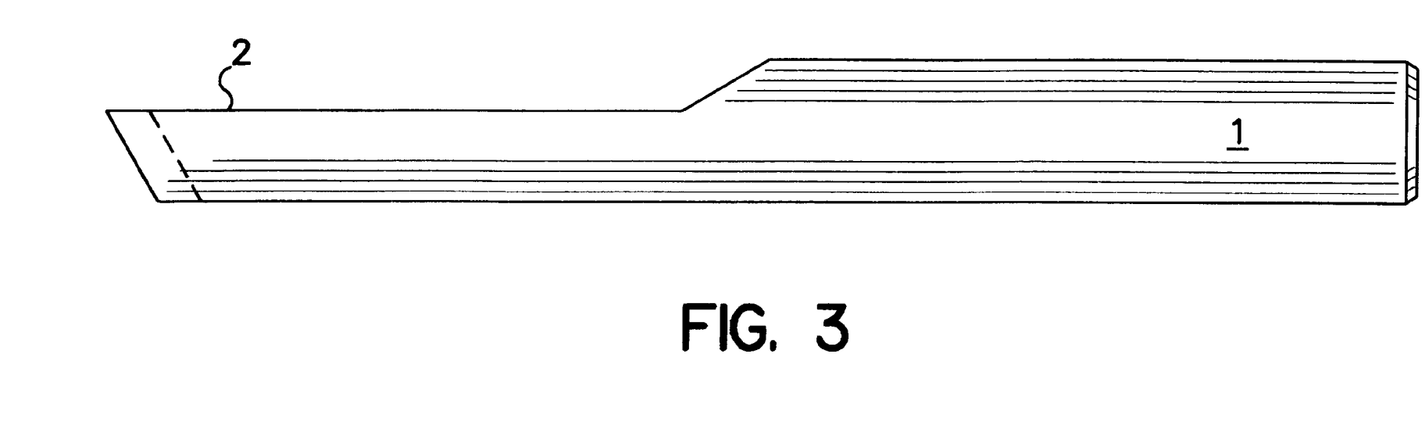
FIG. 3 is a side view of the embodiment in FIG. 1.

The tool may be coated with titanium nitride, Ovshinsky, or other coatings to enhance tool life and/or performance. A flute or chip pocket is indicated at 2. In this embodiment the flute generally runs from 10–15× the drill diameter regardless of the length of the drill. The chip pocket terminates in an angular shoulder or radius 3 to retain strength The flute 2 is ground approximately 37½% of the drills' diameter creating a substantial pocket that chips readily fill (A FIG. 2). This leaves cutting edge 4 approximately ⅔ of the drill diameter creating a very strong cutting tooth. The ⅔ geometry provides better guidance of the drill in the hole reducing chatter and deflection until the full diameter of the drill enters the hole. The cutting edge typically is a 20°×20° compound angle. This simple geometry is readily manufactured and can be made in sizes at least as small as 0.005". As the geometry is a simple single point beveled edge, without a second matching edge to replicate as to geometry, angle and length (as in a twist drill) it is of no consequence if the the original angles are not reproduced exactly. It will be noted therefore that the drill can be resharpened by anyone skilled enough to resharpen a lathe tool bit.

Sizes as small as ¹⁄₃₂ can be resharpened on an off hand tool grinder. Smaller sizes down to 0.015 can be hand stoned. This size is best resharpened with the aid of the sharpening fixture that will be described later.

It will also be noted that this embodiment can be converted into a left hand tool by regrinding the point with an oppositely angled bevel.

The cutting edge of this embodiment is not capable of creating its own starting hole and requires the tool follow a combined center and countersink drilled hole at the very least. The geometry of this particular embodiment is suited to readily drillable materials such as brass, aluminum, wood, plastic, etc.

In operation, drilling proceeds as follows:

The work is first center drilled with a generous center drilled hole. The conical recess will act to guide the drill into the hole. The drill is chucked in either a chuck or preferably held in a collet. The tool extension is adjusted to just beyond the length of the flute. Spindle speed is adjusted from several hundred rpm to a few thousand rpm. In so much as the tool is a single point tool, it represents an unbalanced cutting condition. The use of higher rpm magnifies the detrimental effects of this condition.

Figure 4:
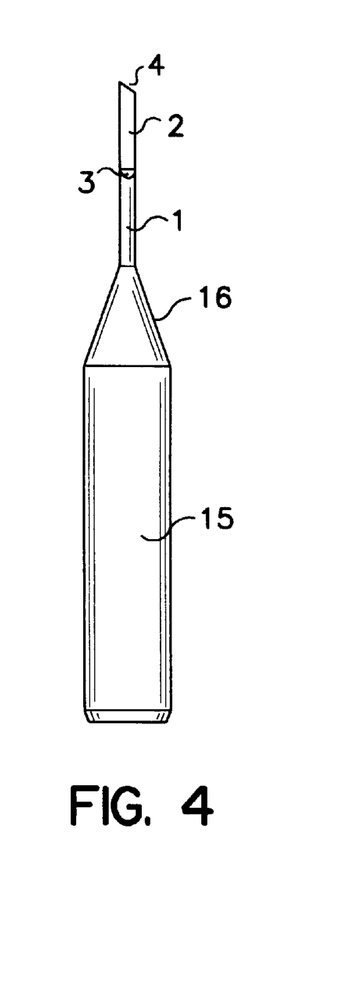
FIG. 4 is a plan elevation view of the embodiment in FIG. 1 having a larger concentric shank for chucking the tool.
Figure 8:
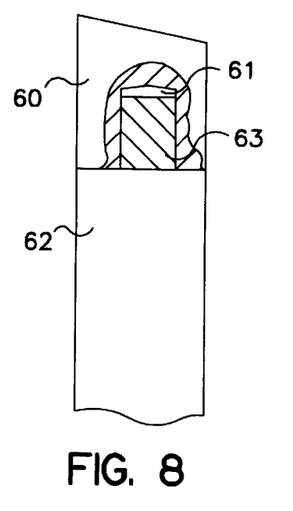
FIG. 8 is a segmented plan elevation view partially in section of a carbide tipped embodiment of the invention.
Figure 9:
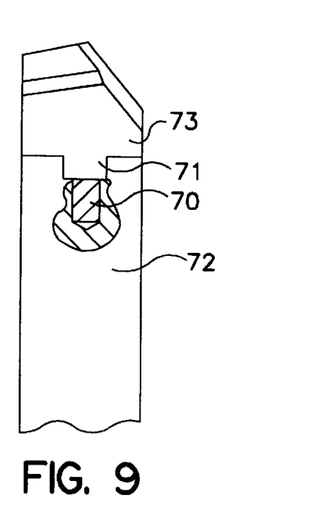
FIG. 9 is a segmented plan elevation view partially in section of another carbide tipped embodiment of the invention.

Drilling proceeds until the depth of the drill extension is reached using a Peck feed cycle either manually or under CNC control. Careful depth control is essential for the proper performance of the tool as the chin pocket capacity is limited. Peck depth is generally ½ the tool diameter for this embodiment. After reaching the drill extension depth, the drill is extended to twice the original extension. The Z datum is reestablished and drilling proceeds via peck cycle to this depth. While the total extension of the tool is increasing the effective extension remains the same as the tool is supported by the walls of the hole previously drilled. The operation is repeated numerous times until the desired depth is reached. Depths of 50× the tool diameter are readily achievable on vertical spindle machines. Depth penetration is limited by the tool's ability to overcome gravity in pulling chips out of the hole. On a horizontal spindle machine such as a lathe with a dead spindle, chips remain on the pocket and are extracted a "spoonful" at a time. Here depth capability can be 200× the drill diameter. Holes produced by this embodiment tend to be drill quality holes—somewhat oversize. While the drawings show the drilling portion as a straight uniform shaft it is understood that the drill can be manufacturer with a larger concentric shank segment (FIG. 4). The larger portion 15 of the tool is for chucking the tool. In sizes below 0.010" manipulating the drill becomes difficult. In addition, few chucks are available that can accomodate these sizes and it is difficult to get the drill to run true. In addition, these size drills are easily lost. In the case of these "micro" sizes, the drills would be manufactured as a set having progressively longer drill lengths. These drills would be used in sequence to achieve small diameter deep holes. It should also be understood that while the tool may be constructed from solid carbide or H.S.S. it is feasible to manufacture the drill as a carbide tipped tool whose performance would be superior to the solid homogenous construction of either material. The tipped tool can be produced in sizes at least as small as 1/32". Shown in FIGS. 8 and 9 are two embodiments. In FIG. 8 a concentric diameter 63 is around on the HSS tool 62 and a blind hole 61 is EDM in the carbide 60. The assembly is brazed together and centerless around. In the embodiment in FIG. 9 the carbide tip 73 has a concentric ground diameter 70 which may be in combination with a keyed portion 71. The HSS shank 72 has an EDM hole and a slot to accomodate the carbide tin. The assembly is brazed together and centerless ground. Then the flute and the point are ground into the tool. Tungsten carbide holds an edge many times longer than HSS, however carbide is very brittle and breaks easily in these small sizes. By employing carbide only for the cutting tip the benefit of the long wearing edge is obtained while the use of the HSS shank provides the benefit of the resiliant steel.

Figure 5:
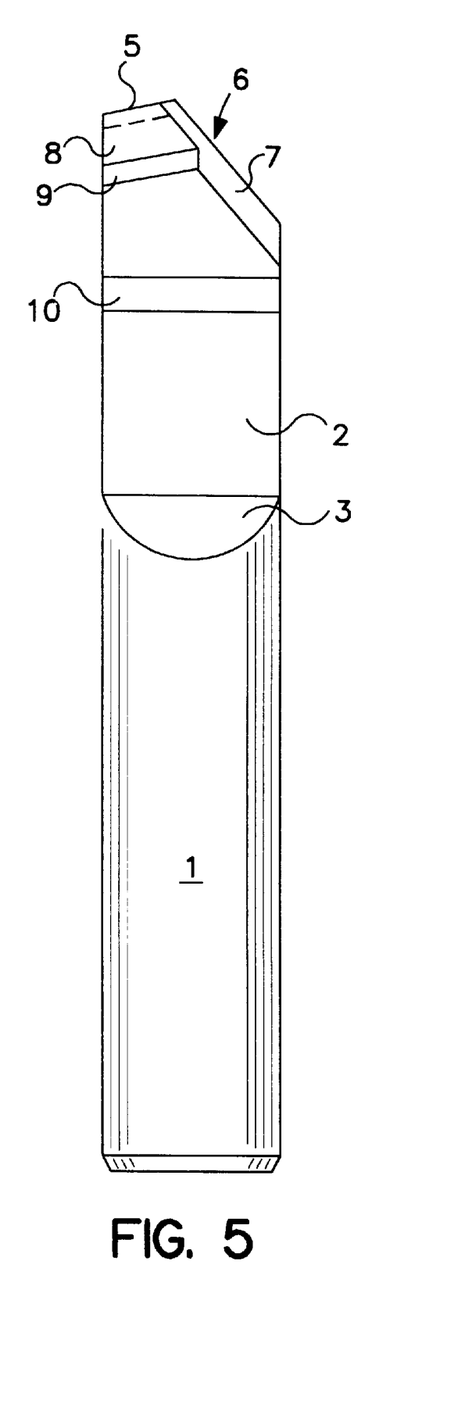
FIG. 5 is a plan elevation of a modified point embodiment of the drill for difficult materials.

Another embodiment of this drill is shown in FIG. 5. This version of the tool is capable of drilling difficult materials, produces more accurate holes and will produce straighter holes. Like the previous embodiment it has a body portion of straight uniform diameter indicated at 1. The chip pocket portion of the tool is shown at 2. It is shorter in length than the previous embodiment generally from 6–8× the drill diameter for increased strength and it terminated in a radius or angular shoulder 3 as with the previous embodiment.

The point geometry of this embodiment differs however. It consists of a dual angled point. A lesser angle 5 and a greater angle 6. The lesser angle 5 is the cutting edge, typically a 10°×20° compound angle. The width of this angle is from 1/3 to a maximum of 1/2 the drill diameter. This relaxes the tolerance on grinding the cutting point and provides some advantage when resharpening is necessary, for if the width of the edge is 1/3 the diameter then only surface 5 need be reground instead of multiple surfaces. The angle of cutting edge 5 is disposed in the opposite direction of the previous embodiment. This represents a conical edge that has gyroscopic cutting action that helps keep the tool centered. The combination of the centering action and guidance from the body of the drill serve to produce straight accurate holes. The greater angle 6 is the relief angle, typically it is a 45°×20° compound angle. As the tool has one cutting edge and is cutting a conical cavity in the work, the surface of the opposing quadrant of the drill must be relieved so not to rub on the surface of the work. Without rubbing relief, fracturing of the opposing surface or breakage of the drill may occur. In the case of the previous embodiment the oppositely disposed cutting edge is cutting an M shaped profile (cavity) which creates greater clearance for the tool. Shown at 7 is a salient feature of this embodiment, it is a negative rake angle, which runs along greater angle 6 typically it is a 30° negative rake. In a conventional two flute drill the cutting teeth are mirror images of each other, with the opposite tooth being inverted and oppositely disposed to the other tooth from the centerline. The opposing tooth is inverted as it is as it must cut on the opposite rotation. The two cutting teeth balance and cancel out the cutting forces generated. While the single point has a stronger tooth geometry and better chip clearance the cutting forces are unbalanced. These forces are significant. While the modified point embodiment can start its own hole if done carefully the forces are significant enough to push the drill over to the opposite quadrant. Even with opposing relief 6 this surface can contact the opposite wall of the workpiece causing possible chipping or complete failure of the tool. While the design of the single flute precludes an opposing tooth, the negative rake 7 along relief angle 6 functions as a counter cutting edge—when deflected into the workpiece it will cut, exerting some force to counter the deflection. Even though it is on the opposite rotation, the negative rake functions as a knife edge that will cut regardless of the rotation it encounters.

Seen at 8 is a land approximately 1/2 to 1 1/2 diameters in length. This portion of the flute is ground to the centerline of the drill making a more efficient cutting edge. In the previous embodiment the cutting edge remains above the centerline. With the tool above centerline, it means there is an area of the work that is not being drilled. The tool is able to cut because in small sizes the difference between the centerline and the 2/3 flute geometry may be only a few thousandths of an inch and because the material is soft the tool can plow through the work. In the case of harder materials leaving an area of the work uncut is intolerable. With the cutting edge on centerline all the material is being cut. This also contributes to the production of more accurate holes. The centerline land 8 is restricted in length to retain strength and it terminates in an angular shoulder 9, likewise to retain strength. Leaving the land on the long side, 1–1 1/2× the diameter is a practical consideration as it means that in resharpening only surfaces 5,6,7 need be restored as necessary. Once land 8 is gone it must be reground as well. This requires a surface grinder and the sharpening fixture.

Seen at #10 is an optional slot or groove approximately 1–1 1/2× the drill diameter in width that is around to the centerline being located approximately 3 or 4 diameters from the tip. It is suited for through hole applications. As noted earlier the unbalanced cutting force causes tool deflection so that the bottom of the hole tends to be slightly smaller than the rest of the hole. Grinding the flat to the centerline gives it cutting properties allowing it to cut the bottom of the hole by extending the cutting flat portion of the drill beyond the exit depth of the work.

Figure 5A:
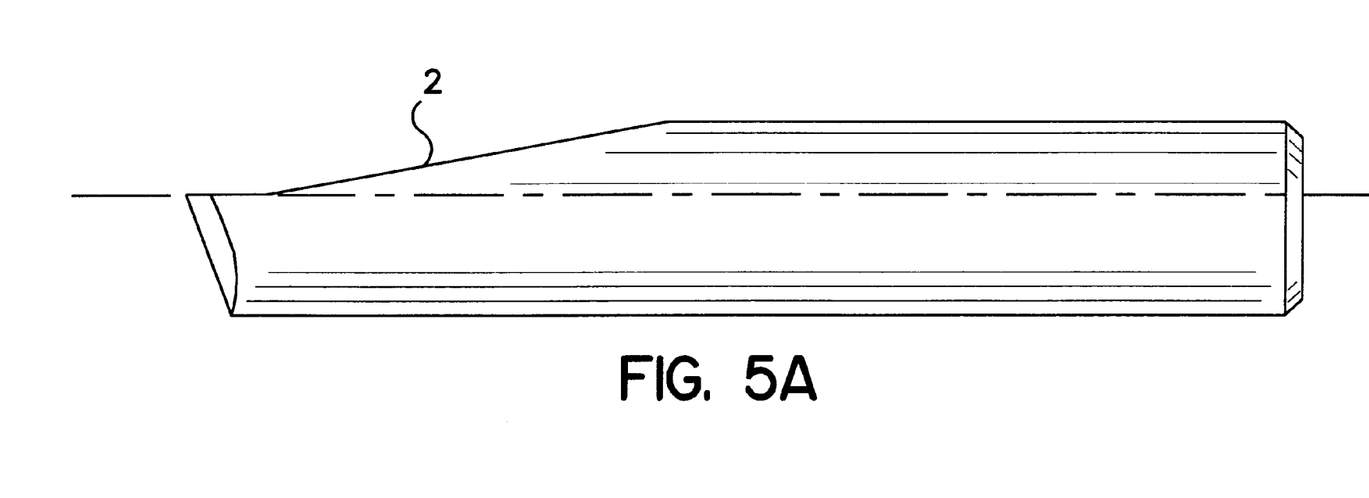
FIG. 5A is a side view of an alternate taper flute embodiment of FIG. 5.
Figure 6:
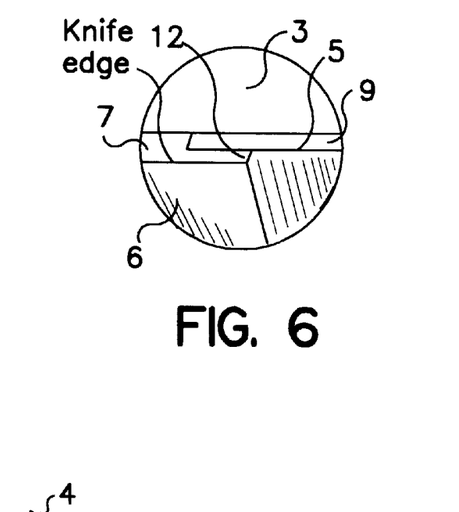
FIG. 6 is a head on view of the embodiment shown in FIG. 5.
Figure 7:
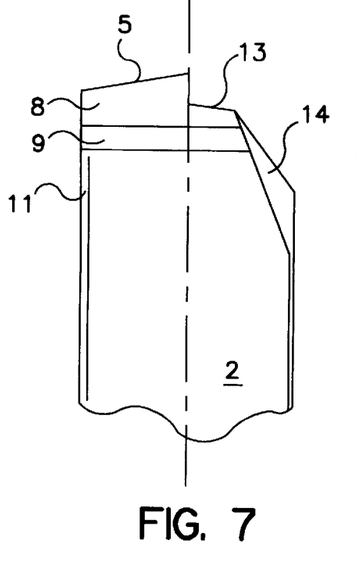
FIG. 7 is a segmented plan elevation view of another embodiment of the invention for larger sizes.

Shown in FIGS. 5A & 7 are alternate embodiments of the modified point tool. The embodiment in FIG. 5A is identical to that shown in FIG. 5 except flute 2 is tapered as shown. This produces maximum strength in the drill for very difficult materials albeit at the expense of decreased peck depth. The embodiment in FIG. 7 is for larger sizes of the tool. Features 1,2,3,5,8,9 are the same as the previous embodiment. Relief angle 6 is instead ground away 13 up to or just shy of the tool's centerline. This represents the half of the tool that would rub on the workpiece. Relief area 13 is a mirror angle to edge 5 typically 10°×20° and relieved back for about 1/4–1/2 the tool diameter. Centerline land 8 is about 1× the tool's diameter in length. In larger sizes splitting the centerline is easier to achieve and a tolerance of ±0.001" is much less significant in larger size drills. The advantage of this geometry is that it eliminates the chisel edge 12 at the center shown in the embodiment in FIG. 5. This cuts more efficiently and penetrates the work easier. A counter cutting edge 14 is ground on the periphery of the tool. It is typically ground at 45° to the horizontal axis of the tool and typically 10° to the longitudinal axis of the tool. The edge 11 of flute 2 may be honed to a radius to kill any cutting action that may take place by the edge rubbing against the work producing oversize holes. In operation drilling proceeds as with the previous embodiment with peck depth limited to ⅓–¼ the drill diameter. In the case of the 0.015" drill peck depth may be limited to ⅕ the drill diameter.

Holes produced by the embodiments in FIGS. 5 & 7 are more accurate than the holes produced with the previous embodiment. Additionally, the modified point embodiment also produces straighter holes. In addition it will be noted that either embodiment is free from the breakout phenomenon experienced with conventional twist drills whose helical flutes tend to grab and pull the workpiece upward. In the same regard drilling intersecting holes in the workpiece also does not create a problem.

To facilitate the resharpening of the embodiments shown in FIG. 1 and FIG. 5 a sharpening fixture shown in FIGS. 10–15 is utilized. The fixture consists of two rectangular pieces 25 and 50 secured by screw member 40 and nut 41. The through hole 42, 51, in upper and lower fixture members 25, 50 is located on the centerline of the fixture. On the underside of bottom member 50 is an axial slot 52 sized to accomodate the T head of screw A. The T head insures cross hole 43 in screw 40 is aligned with the axis of the fixture, permitting the drill to pass through the screw and it prevents the rotation of screw 40 upon tightening or loosening of nut 41. An anti-rotation pin 28 can be located virtually anywhere on the fixture, is shown in the lower left corner of FIG. 8. The pin is pressed or otherwise secured in through hole 33 in one member and is a slip fit in the other 33a. it will be noted that the fixture can be tightened or loosened by simply turning a single nut, or knob 41.

Figure 14:
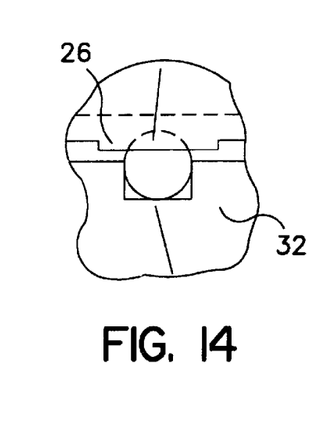
FIG. 14 is a head on segmented view of the assembled sharpening fixture embodiment showing a drill secured in the U channel.
Figure 15:
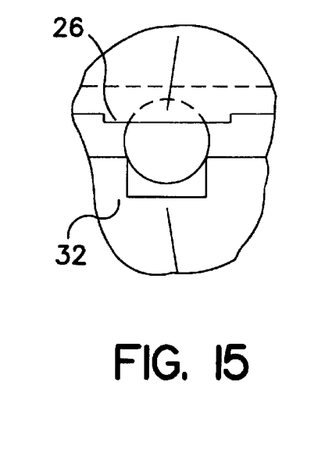
FIG. 15 is a head on segmented view of the assembled sharpening fixture embodiment showing a drill secured on the wall section of the U channel.
Figures 16, 17:
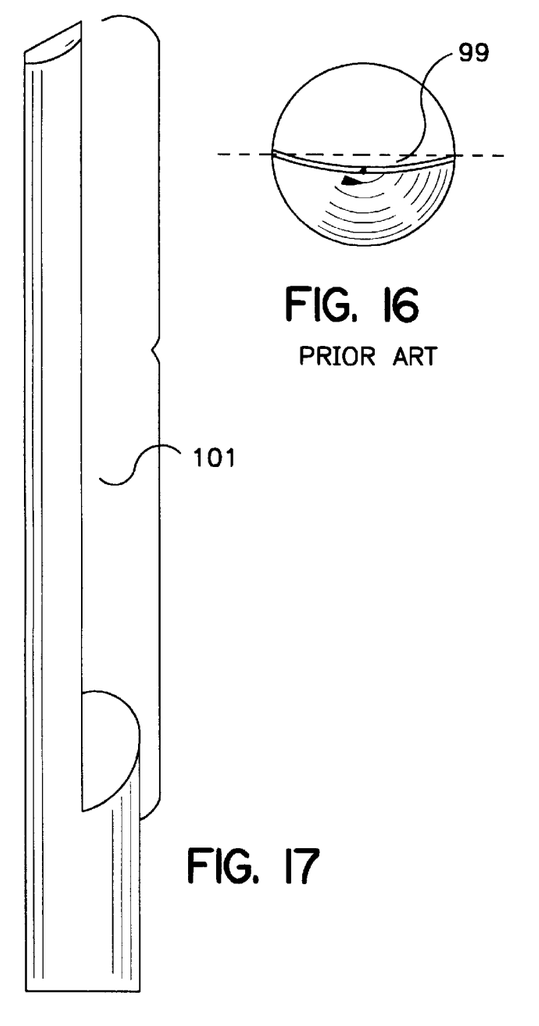
FIG. 16 is head on view of prior art half round drill.
FIG. 17 is a side view of the prior art embodiment in FIG. 16.
Figure 18:
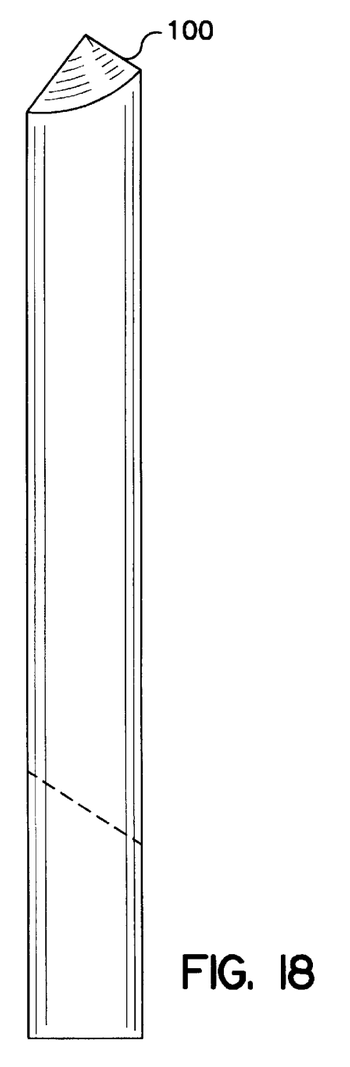
FIG. 18 is a plan elevation view of the bottom side of FIG. 16.

Running along the centerline on the top side of bottom member 50 is a rectangular U or V slot 32. This slot accomodates the drill to be sharpened. The fixture is made with slots having a variety of widths/depths for different diameter drills. Each particular slot will accomodate a range of drill diameters. For example a fixture with a 0.016" wide slot X 0.008" deep will accomodate a ¹⁄₆₄" diameter drill locating it within the U slot 32 (FIG. 14). Larger diameter drills will locate in the fixture by seating on the corners of the U slot 32 (FIG. 15). Each fixture accomodates a 0.015" range so drill sizes from ¹⁄₆₄"–¹⁄₁₆" can be resharpened utilizing 3 or 4 fixtures.

Figure 11:
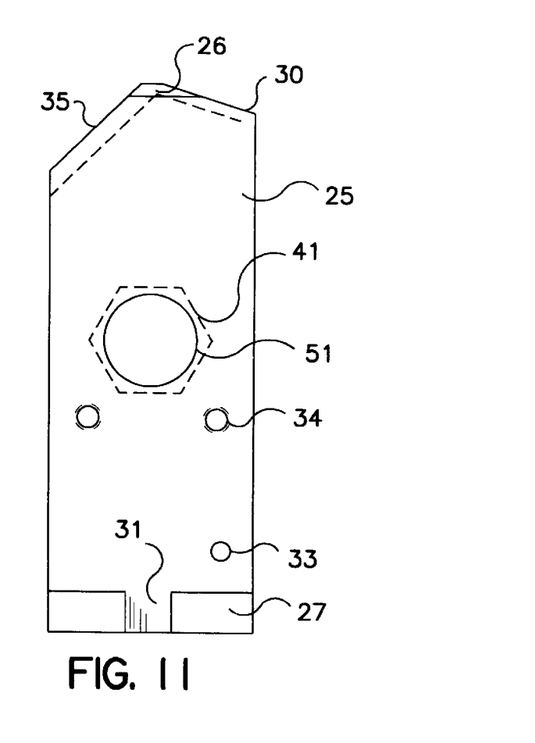
FIG. 11 is a plan elevation view of the underside of the upper member of the sharpening fixture.
Figure 12:
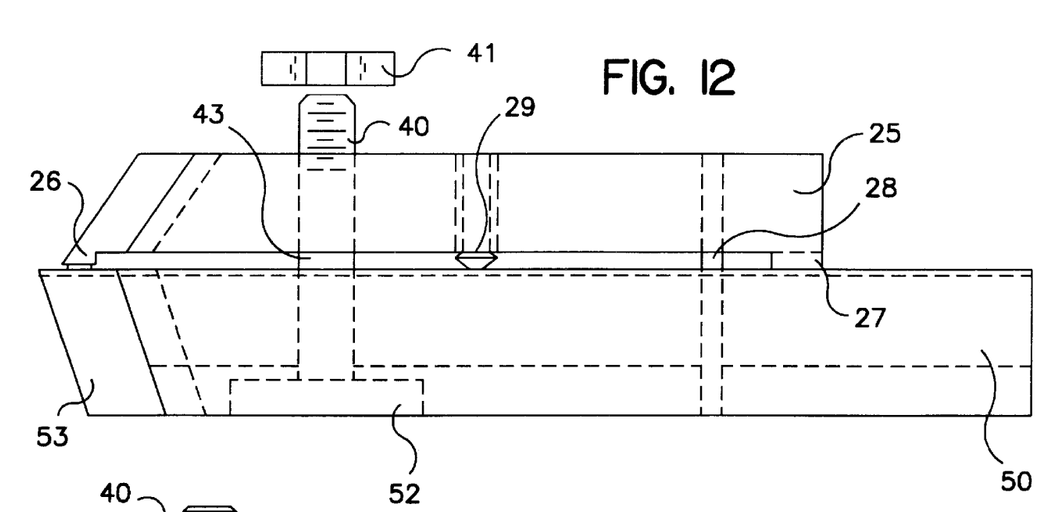
FIG. 12 is a side view of the upper and lower fixture member assembly.
Figure 13:
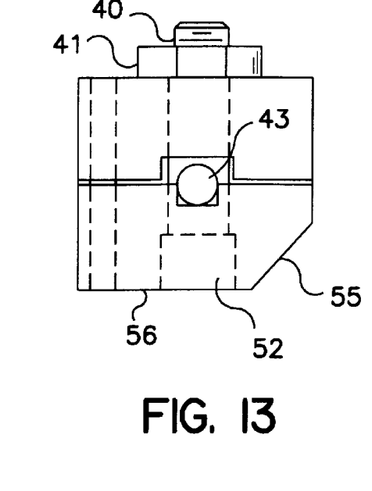
FIG. 13 is a back end view of FIG. 12.

On the underside of the upper member 25 of the fixture, most of the bottom is relieved leaving a land at the top 26, the depth of the relief and the width of the land is proportional to the fixtures drill size range. On the smallest size fixture two lands 27 separated by a longitudinal slot 31 on the centerline of the fixture are located at the opposite end of land 26. These lands are slightly higher in height than forward land 26 so that when clamping screw 40 is tightened the forward land assumes a downhill attitude. The forward land 24 clamps the flute of the drill 2 and orients the flute in a horizontal plane for resharpening. For larger size fixtures the rear lands 27 are replaced by two threaded holes 34 in upper member 25 just rearward of screw 40. Two set screws 29 are adjusted according to the size of the drill being resharpened to adjust the attitude of the top member for optimum clamping on the drill flute. Alternatively, adjusting set screws 29 may be eliminated by drilling hole 33 at a slight angle, this results in upper member 25 having an "open mouth" bias which is closed onto the drill by tightening nut 41.

Figure 10:
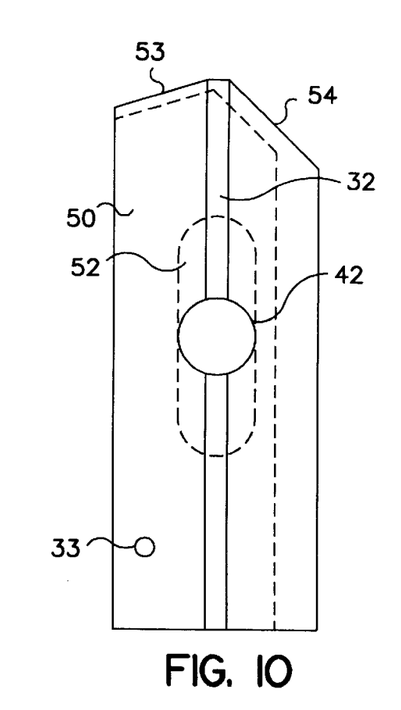
FIG. 10 is a plan elevation view of the top side of the lower member of the sharpening fixture.

The forward most portion of the fixture mimics the geometry of the drill. The lower member 50 would typically have 10°×20° (53) ×45°×20° (54) angles. The secondary angles can be increased 10°×25°×45°×25° for example to create increased clearance so as not to to grind the fixture when resharpening the drill. The forward most portion of the upper fixture member likewise terminates in angular surfaces typically 10°×0° or 10°×20° (35) and 45°×30° (30).

While the forward portion of the fixture mimics the modified point embodiment it will be noted that the previous drill can be resharpened with this fixture as well. One need only set the mitre gage and table angle to 20°×20° instead of 45°×20°.

The bottom member 50 may be longer than upper member 25 to provide protection to long drill bits, and the shorter length of the upper members allows drills to be manipulated for instalation/removal. When assembled, (FIG. 12) the upper and lower fixture members essentially meet at their forward end. Once the drill is clamped in the fixture sharpening proceeds, preferably with a grinder with a mitre gage and tilting table. A good quality belt/disc sander with 400–600 grit abrasive works well. For smaller sizes a jewelers loupe or other optical aid may be utilized. After grinding angles 5 and 6 negative rake angle 7 may be ground by tilting the fixture on beveled surface 55. The mitre gage is reset so that grinding will take place uniformly along edge 6.

Alternatively, it is possible to sharpen a drill point by hand with nothing more than a stone or diamond hone. The compound angles of the fixture being used as a guide to resharpen surfaces 5,6,7. Since the base of fixture 56 is a flat rectangular surface and the drill is clamped parallel to this surface then centerline land 8 can be reground on a surface grinder.

It should be understood that while the embodiment described is especially useful for small size drills the scope and spirit of the invention can encompass larger size drills and half round drills as well. It being understood the helical point would be replaced with a functional angular point. Chances in the clamping arrangement may be made without departing from the scope and spirit of the invention. For example the central securing T headed screw may be replaced with 4 periphial posts and 2 screws to secure upper and lower fixture members. The invention shall not be considered limited except by the following claims.

I claim:

1. A single sided drill bit comprising a drilling section and a chucking section, wherein said drilling section comprises a uniform diameter throughout its length and a flute cavity comprising a straight transverse plane at approximately ⅔'s the drill cross-sectional area, said flute creating a void of approximately ⅓ the drill cross-sectional area, said flute having a length of about 4 to 15 times the drill diameter, said flute terminating in an angular shoulder with the drill body.

2. The drill bit according to claim 1 wherein the transverse planar flute is inclined to the axis producing a tapered flute.

3. A drill bit according to claim 1 wherein the leading end of the drill has a portion of the transverse planar flute ground to the centerline of the drill creating a land for a length of about ½ to about 1½ times the drill diameter, said land making an angular transition to the flute.

4. A drill as in claim 1 having a dual compound angle point, said point consisting of a shallow angle and a steep angle, said shallow angle being from ⅓ to ½ the drill diameter, said shallow cutting point is disposed to produce a conical cut.

5. A drill as in claim 4 in which the steep angle of the point has a negative rake angle along its edge to create a counter cutting edge to cut when the direction of rotation is reversed.

6. A single point drill consisting of a larger shank diameter for chucking and a concentric drill diameter, said shank tapering to the drill diameter by means of an angular shoulder, said drill diameter being uniform throughout its length and having a flute cavity characterized by a straight transverse plane at approximately ⅔ the drill diameter, said flute creating a void of ⅓ the drill diameter, said flute being limited in length to 4 to 15 times the drill diameter and terminating in a shoulder selected from among angular and radial.

7. A drill in claim 6 in which the transverse planar flute is inclined to the axis to produce a tapered flute.

8. A drill as in claim 6 in which the drill diameter portion is made in varying progressive lengths.

9. A drill as in claim 6 having a single compound angle point disposed from the peripheral edge and inclined across the axis a minimum of 20°.

10. A drill as in claim 6 in which the leading end of the drill has a portion of the transverse planar flute ground to the centerline of the drill for a length of ½ to 1½× the drill diameter, said land making an angular transistion to the flute.

11. A drill as in claim 10 having a dual compound angle point comprising a shallow angle and a steep relief angle, said shallow angle being from ⅓ to ½ the drill diameter, said point having the shallow cutting point disposed to produce a conical cut.

12. A drill in claim 11 in which the steep relief angle of the point has a negative rake angle along its edge to create a counter cutting edge.

13. A drill as in claim 1 having a brazed carbide tip portion.

14. A single sided drill bit comprising a drilling section and a chucking section, wherein said drilling section comprises a uniform diameter throughout its length and a flute cavity comprising a straight transverse plane at approximately ⅔'s the drill cross-sectional area, said flute creating a void of approximately ⅓ the drill cross-sectional area, said flute having a length of about 4 to 15 times the drill diameter, said flute terminating in a radial shoulder with the drill body.

15. The drill bit according to claim 14 wherein the transverse planar flute is inclined to the axis producing a tapered flute.

16. A drill bit according to claim 14 wherein the leading end of the drill has a portion of the transverse planar flute ground to the centerline of the drill creating a land for a length of about ½ to about 1½ times the drill diameter, said land making an angular transition to the flute.

* * * * *